United States Patent Office 2,869,852
Patented Jan. 20, 1959

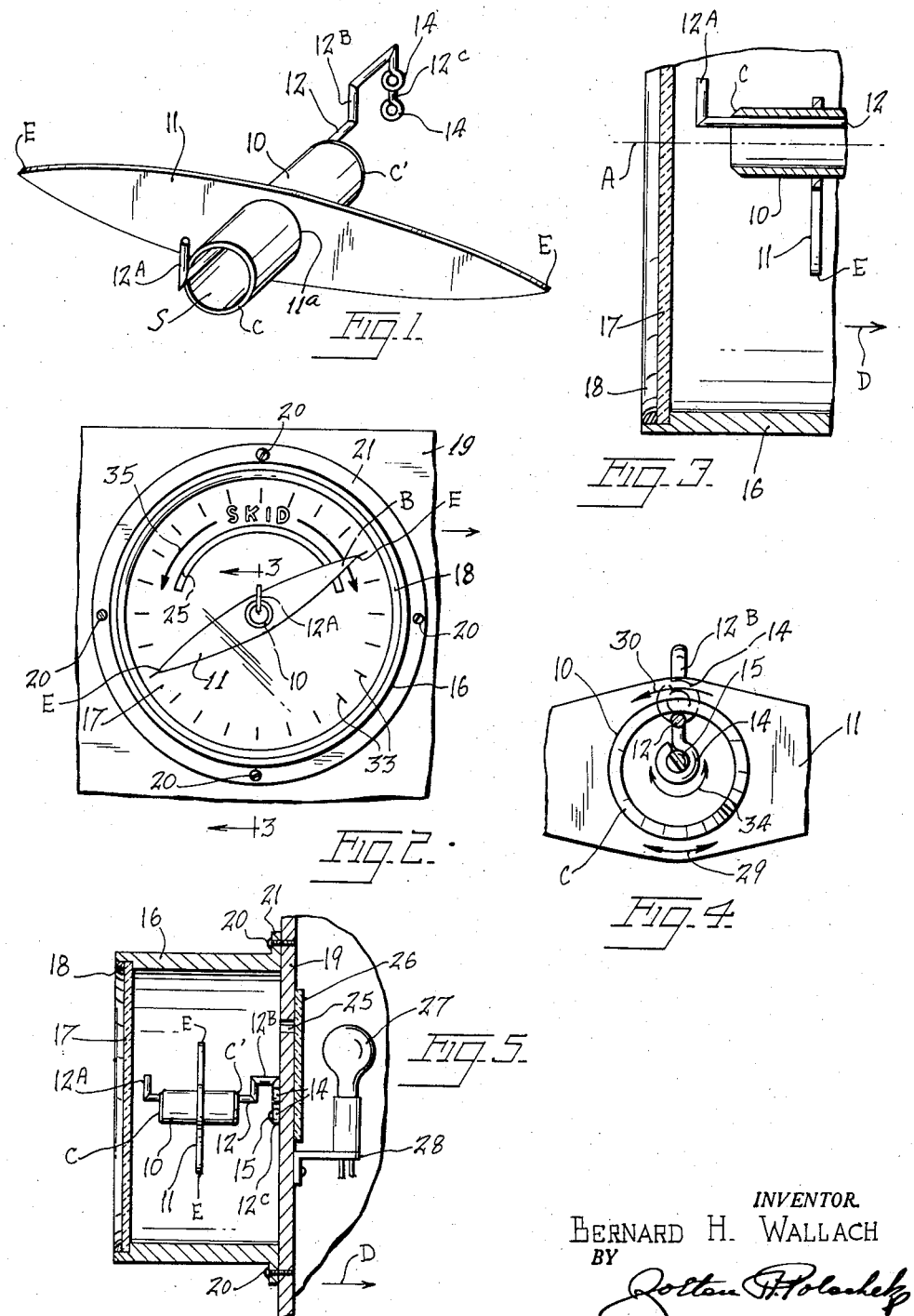

2,869,852

SKID INDICATOR FOR VEHICLES

Bernard H. Wallach, Bronx, N. Y.

Application June 1, 1956, Serial No. 588,695

1 Claim. (Cl. 264—1)

This invention concerns a skid indicator for a vehicle.

The invention is directed at providing a device usable in a vehicle such as an automobile or truck for indicating the beginning of a sudden lateral movement or side skid. The indication provided to the driver is instantaneous and thus the driver may take instant countermeasures to forestall the skid. It is possible to use the device in an airplane for indicating a side slip.

A basic embodiment of the invention includes a small hollow metal tube which may be about one-eighth inch in diameter and three-eighths of an inch in length. The tube is suspended eccentrically on a fine shaft or wire which may have a diameter of about one sixty-fourth of an inch. A suitable pointer is attached to the tube. The several members may be enclosed in a casing rigidly mounted in a vehicle. The axes of the tube and shaft will be disposed parallel to each other and to the forward direction of travel of the vehicle.

Ordinary side movements involving accelerations or decelerations on turns will cause the tube to swing pendulously to one side or another with the shaft serving as a pivot. Normal road shocks will cause the tube and pointer to oscillate about the shaft. The tube has a very small diameter so that the oscillation frequency will be very high and the lateral angular excursions of the tube will be very short. If the vehicle should begin an abnormal side movement as in an incipient lateral skid, the sudden side acceleration will cause instant circumferential slippage between the smooth inner surface of the tube and the supporting shaft.

The tube and pointer will turn about their common central axis to render a visible indication of the skid before the driver or operator can become otherwise aware of the lateral skid condition. Thus the driver can take suitable instant action to counteract the skid before the great mass of the vehicle has attained the full and generally dangerous velocity of the lateral skid.

It is therefore a principal object of the invention to provide an indicator device responsive to a lateral skid of a vehicle.

It is a further object to provide a simple mechanical device for automatically indicating the beginning of an abnormal lateral acceleration of a vehicle.

It is a further object to provide a small massive tube pendulously supported on a fine shaft and provided with a pointer for indicating the beginning of a lateral skid.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a portion of the indicator device according to the invention.

Fig. 2 is a front elevational view of the device.

Fig. 3 is a sectional view taken on lines 3—3 of Fig. 2.

Fig. 4 is a front elevational view on an enlarged scale of a fragmentary portion of the device.

Fig. 5 is a side view partly in section of the device.

In Figs. 1 to 5 are shown a hollow cylindrical tube 10 of brass or other massive material. The tube carries a thin light weight double ended pointer in the form of a leaf 11 having pointed ends E. The tube is loosely and floatingly suspended on a stiff steel shaft or wire 12. The shaft has two upstanding end sections 12A and 12B. The rear end portion of the shaft is bent to form a support section 12$^c$. The front and rear ends of the tube have chamfers or bevels C, C' respectively, to prevent frictional engagement of the ends of the tube by the front shaft section 12A and rear shaft section 12B which serve as stop elements for longitudinal movement of the tube. Rear section 12$^c$ has apertured loops 14 for insertion of suitable supporting screws 15 shown in Fig. 4. Leaf 11 has a central opening 11$^a$ and is secured midway the ends of the tube, being perpendicular to the central axis A thereof.

In Figs. 2, 3 and 5 the tube 10 and shaft 12 are shown disposed in a cylindrical housing or casing 16. The casing may have a transparent front plate 17 held in a groove of the casing by a bezel or frame 18. The casing is mounted on a wall plate 19 such as a dashboard of a venicle. Screws 20 secure the flange 21 of the casing to wall 19.

A curved slot 25 may be provided in wall 19 behind which may be disposed a translucent or frosted glass plate 26 and a lamp 27 supported on a bracket 28. Pointer 11 is a thin member of paper or plastic and may be transparent or translucent. If the pointer is rather translucent and colored red it will exhibit a red band B where it crosses slot 25 when in a tilted position as shown in Fig. 2. The tube 10 and shaft 12 are mounted so that their axes are parallel to each other and to the forward direction D of travel of the vehicle.

The tube 10 is freely suspended on the shaft so that the tube and pointer oscillate pendulously about the shaft as indicated by double-headed arrow 29 in Fig. 4, when the vehicle sways laterally or encounters road shocks. The tube will swing sidewise through a small angle to one side or the other about the shaft as a pivot at the beginning of each turn of the vehicle. If the vehicle should suddenly begin a sudden sidewise skid the tube 10 will tend to rotate about its axis A as indicated by arrow 34 in Fig. 4, and the highly polished inner surface S will facilitate slippage of the tube circumferentially and tangentially on shaft 12. A counter-clockwise movement of the tube is indicated by arrow 30 in Fig. 4. This tube movement is accompanied by a tilt of pointer 11 which will be visible behind index markings 33 on plate 17. If the interior of the vehicle is dark the tilt of the pointer will be shown by the position of colored band B along slot 25 which is illuminated by lamp 27. The driver of the vehicle is thus made aware instantly that a dangerous lateral skid is beginning as the vehicle starts the abnormal lateral acceleration and can attempt to correct the vehicle's movement before a dangerous lateral velocity is attained.

The pointer 11 may be initally set to normal equilibrium position by merely tapping with the finger of the hand against the side of the casing 16.

The degree or rate of lateral acceleration required to tilt the pointer into the Skid range 35 marked on plate 17 will depend on the amount of friction between shaft 12 and the inner surface of the tube, and the mass of the tube and pointer. These factors can all be so selected that high frequency small oscillations of the pointer due to normal vibrations of the vehicle, and large angular swings due to normal low acceleration turns, will not tilt the pointer into the Skid indication range 35. The mechanical parameters of the device will be so selected that only the beginning of a true lateral skid will cause a pointer deflection into the Skid range 35.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A lateral skid indicator for a forwardly traveling vehicle, comprising a hollow cylindrical casing having means for fastening same to a vehicle, said casing have a transparent face with index markings arranged in a circle thereon and having a wall at its rear end, said wall having an arcuate shaped opening therein, a round shaft supported in the casing by said wall, said shaft having upturned ends, a hollow, massive elongated cylindrical tube, said tube having a smooth inner surface loosely sleeved over the shaft between the upturned ends, with said surface resting on the shaft, said tube having an internal diameter several times greater than the diameter of the shaft so that the tube normally oscillates rapidly with small lateral excursions on the shaft as a pivot during normal travel of the vehicle, and so that the tube slips angularly on said surface through a considerable circumferential distance with respect to the shaft upon the beginning of a sudden lateral acceleration of the vehicle, a pointer of translucent material mounted perpendicularly to said shaft and the axis of the tube to indicate the angular slippage of the tube on the shaft by angular movement of the pointer, and a lamp disposed behind the opening in the wall for illuminating said pointer.

References Cited in the file of this patent

UNITED STATES PATENTS

| | | |
|---|---|---|
| 957,773 | Healey et al. | May 10, 1910 |
| 1,328,370 | Dutton | Jan. 20, 1920 |
| 1,368,941 | Klein | Feb. 15, 1921 |
| 1,523,302 | Spiro | Jan. 13, 1925 |
| 2,045,631 | Cavender | June 30, 1936 |
| 2,108,342 | Le Fevre | Feb. 15, 1938 |
| 2,149,401 | Mason | Mar. 7, 1939 |
| 2,694,865 | Le Pera | Nov. 23, 1954 |
| 2,702,518 | Swartzlander | Feb. 22, 1955 |